US012012925B2

(12) United States Patent
Creighton et al.

(10) Patent No.: US 12,012,925 B2
(45) Date of Patent: *Jun. 18, 2024

(54) FLOATING AIRBORNE WIND ENERGY SYSTEM WITH SUBMERSIBLE PLATFORM

(71) Applicant: Windlift, Inc., Durham, NC (US)

(72) Inventors: Rob Creighton, Durham, NC (US); Andrew Stough, Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,756

(22) Filed: Jan. 31, 2022

(65) Prior Publication Data
US 2022/0154697 A1    May 19, 2022

Related U.S. Application Data

(63) Continuation of application No. 16/942,603, filed on Jul. 29, 2020, now Pat. No. 11,236,728.

(60) Provisional application No. 62/880,273, filed on Jul. 30, 2019.

(51) Int. Cl.
*F03D 13/25*    (2016.01)
*F03D 5/02*    (2006.01)
*F03D 9/25*    (2016.01)

(52) U.S. Cl.
CPC ............... *F03D 13/25* (2016.05); *F03D 5/02* (2013.01); *F03D 9/255* (2017.02); *F05B 2240/9174* (2020.08); *F05B 2240/92* (2013.01); *F05B 2240/95* (2013.01)

(58) Field of Classification Search
CPC .. F03D 9/255; F03D 13/25; F05B 2240/9174; F05B 2240/92; F05B 2240/95
See application file for complete search history.

(56) References Cited

U.S. PATENT DOCUMENTS

| | | |
|---|---|---|
| 5,390,618 A | 2/1995 | Wolff |
| 9,248,910 B1 | 2/2016 | Vander Lind |
| 9,308,975 B2 | 4/2016 | Vander Lind |
| 9,327,845 B2 | 5/2016 | Vander Lind |
| 9,604,733 B2 | 3/2017 | Hachtmann |
| 9,676,496 B2 | 6/2017 | Hachtmann |
| 9,732,731 B2 | 8/2017 | Hachtmann |
| 10,309,374 B2 | 6/2019 | Nelson |
| 10,465,657 B2 | 11/2019 | Nordstrom |
| 10,479,482 B1 | 11/2019 | Kuentzel |
| 10,518,876 B2 | 12/2019 | Hachtmann |
| 10,590,911 B2 | 3/2020 | Aull |
| 10,899,422 B2 | 1/2021 | Schmidt |
| 11,236,728 B2 * | 2/2022 | Creighton ................. F03D 5/02 |

(Continued)

*Primary Examiner* — Tulsidas C Patel
*Assistant Examiner* — Thomas K Quigley
(74) *Attorney, Agent, or Firm* — UB Greensfelder LLP (57) ABSTRACT

The exemplary embodiments herein provide an airborne power generation assembly comprising an airborne power generation unit, a submersible platform, an electrified tether winch attached to the submersible platform, an electrified tether connecting between the electrified tether winch and the airborne power generation unit, and a power output exiting from the submersible platform. Embodiments include an underwater docking station with a docking station tether connecting the submersible platform to the underwater docking station. The submersible platform or the underwater docking station may be anchored to the sea bed. Other embodiments include winches for the sea bed anchor tethers and docking station tether.

17 Claims, 13 Drawing Sheets

(56) References Cited

U.S. PATENT DOCUMENTS

| | | |
|---|---|---|
| 2008/0240864 A1 | 10/2008 | Belinsky |
| 2011/0148115 A1 | 6/2011 | Roznitsky |
| 2011/0260462 A1* | 10/2011 | Vander Lind .......... A63H 27/08 290/55 |
| 2013/0221679 A1 | 8/2013 | Vander Lind |
| 2015/0183510 A1 | 7/2015 | Vander Lind |
| 2015/0183516 A1 | 7/2015 | Vander Lind |
| 2015/0225043 A1 | 8/2015 | Gu |
| 2017/0363070 A1 | 12/2017 | Hart |
| 2018/0134357 A1 | 5/2018 | Vestel |
| 2018/0149137 A1 | 5/2018 | Nordstrom |

\* cited by examiner

FLOATING AIRBORNE WIND ENERGY SYSTEM WITH SUBMERSIBLE PLATFORM

CROSS-REFERENCE TO RELATED APPLICATIONS

This application is a continuation of and claims priority to U.S. Non-Provisional application Ser. No. 16/942,603 filed on Jul. 29, 2020, which claims priority to U.S. Provisional Application No. 62/880,273 filed on Jul. 30, 2019 where each application is herein incorporated by reference in its entirety.

TECHNICAL FIELD

Embodiments generally relate to airborne wind energy system, both singular units and farms, generally deployed in deep water off-shore applications.

BACKGROUND OF THE ART

Wind energy has become an increasingly popular source for sustainable energy, even in remote areas. Traditionally, wind energy has been harnessed by farms of traditional wind turbines, with their familiar tall towers and large rotating rotor blades dotting the landscape. However, the most desirable locations for wind farms are often located off-shore, where the wind is strong and steady. However, once the water depth becomes too deep, it becomes economically unfeasible to build such an enormous tower that would then have to be transported to the off-shore location and attached to the sea bed.

SUMMARY OF THE EXEMPLARY EMBODIMENTS

Exemplary embodiments provide a floating airborne wind energy (FAWE) system with a submersible platform having a winch system connected to the sea bed which allows the submersible platform to change its height relative to the sea bed (or the depth under the water surface that the submersible platform is located). By keeping the platform under the water's surface, the system can attenuate many of the forces that can be applied to the system due to rough waters or high winds or a combination. Also, the airborne unit which flies through the sky to generate power can be docked atop the platform and then lowered beneath the water's surface so that the airborne unit as well as the platform are safe from damage during severe weather. Once the severe weather has passed, the winch system will allow the platform to raise again until the airborne unit is above the surface and ready for re-launch. In order to launch/land the airborne device as well as provide flight characteristics, the electrified tether connecting between the platform and the airborne unit can be winched onto a winch that is attached to or within the platform. The airborne unit can also fly and generate power while the platform (and sometimes even the perch for docking) can remain below the surface of the water.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
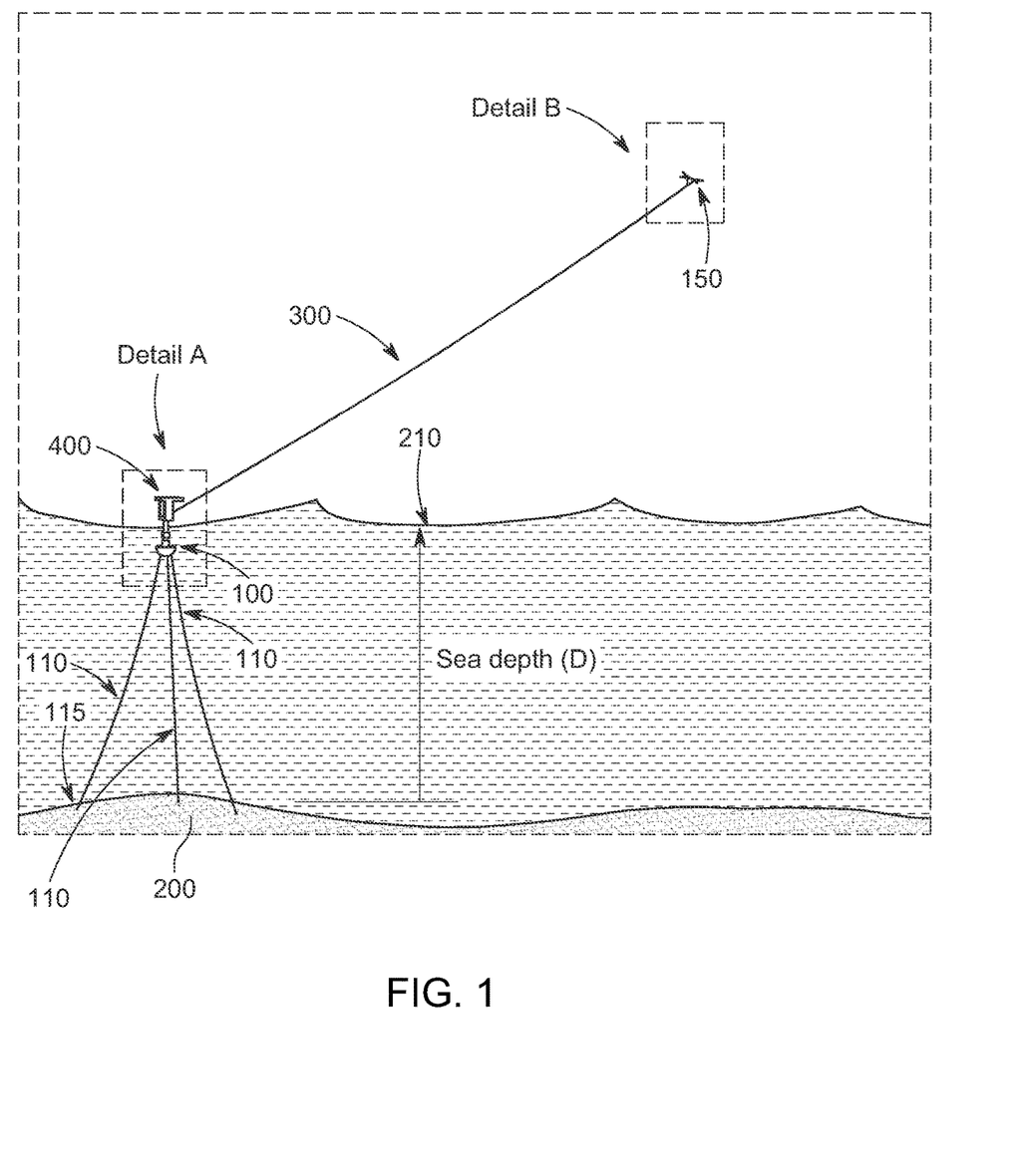
FIG. 1 is a front projection view of an exemplary embodiment of the floating airborne wind energy system (FAWES) with a submersible platform, showing the location of Detail A and Detail B.

FIG. 1 is a front projection view of an exemplary embodiment of the floating airborne wind energy (FAWE) system with a submersible platform 100, showing the location of Detail A and Detail B. Generally speaking, the submersible platform 100 is anchored to the sea bed 200 (sea bed anchor point 115) using one or more sea bed tethers 110. The sea bed anchor points 115 can be any traditional method for attaching chains or cables to the sea bed (and the term 'sea bed' as used herein includes lake bottoms) which are generally large concrete blocks or anchors. Anchor points 115 can also be pylons driven into the sea bed. The sea depth (D) is generally represented as the distance between the sea bed 200 and the water surface 210 in the area of the submersible platform 100. A generally U-shaped landing perch 400 is preferably fixed above the floating platform 100 and is used for launching/landing the airborne power generation unit 150 as well as stowing the entire airborne unit 150 below the surface of the water 210 during severe weather.

Figure 2A:
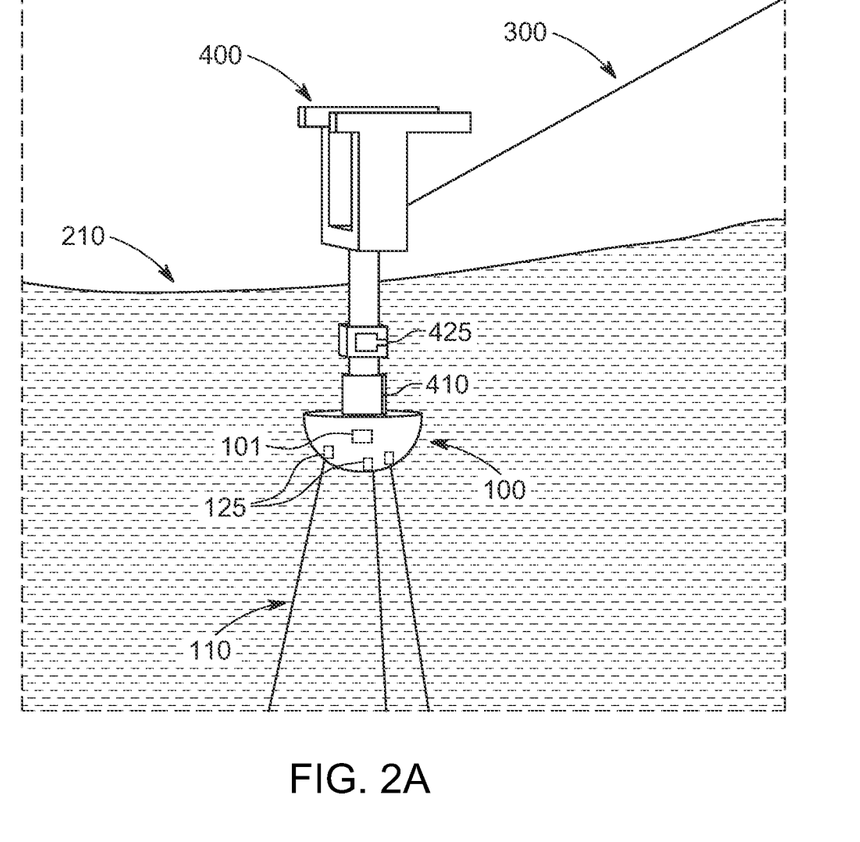
FIG. 2A is a detailed view of Detail A.

FIG. 2A is a detailed view of Detail A. The airborne unit 150 is attached to the submersible platform 100 through the electrified tether 300, which can be winched in/out of the platform 100 using the electrified tether winch 425 so that the airborne unit 150 can both launch/land as well as change altitude or other flight characteristics. The electrified tether winch 425 is preferably fixed within or above the submersible platform 100 and is in electrical communication with a platform controller 101. Each of the sea bed tethers 110 are preferably attached at a first end to the sea bed 200 with the second end being attached to a sea bed tether winch 125 which can retract or pay out the tether 110. In some embodiments, as shown in this figure, each tether 110 has its own separately controllable winch 125. However, other embodiments could of course use a different number of tethers and could also combine the various tethers onto a single winch 125 so that only a single winch could be used to retract or pay out the tethers 110.

As can be observed and will be described further below, by activating the winch(es) 125 and retracting the tether(s) 110 into the submersible platform 100, the submersible platform 100 will be lowered towards the sea bed 200 and away from the water surface 210. In the opposite, activating the winch(es) 125 and paying out the tether(s) 110 out of the submersible platform 100, the submersible platform 100 will be raised away from the sea bed 200 and towards from the water surface 210.

Generally speaking, the landing perch 400 and electrified tether winch 425 are rigidly fixed above the submersible platform 100, it could also be said that they are rigidly fixed to the submersible platform 100. However, in an exemplary embodiment, a shock absorbing mechanism, preferably a heave-suppressing suspension 410 may be placed between the electrified tether winch 425 and the submersible platform 100 to help absorb the forces between the airborne unit 150 and the submersible platform 100.

Figure 2B:
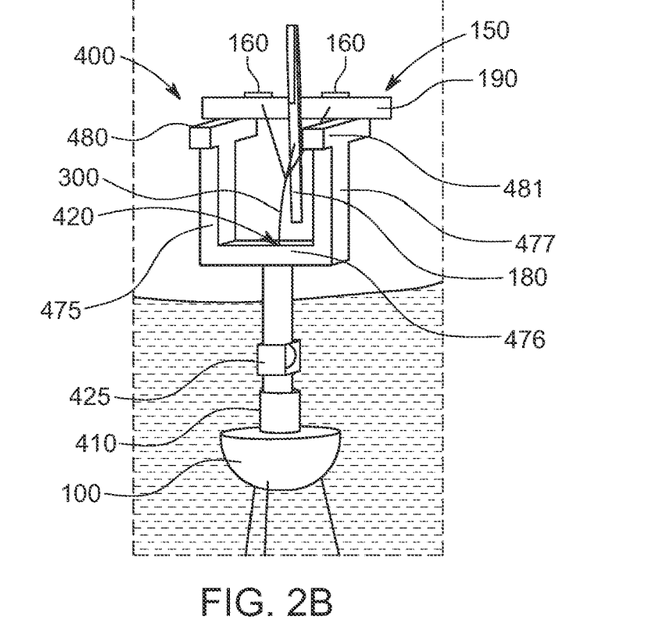
FIG. 2B is a detailed view of the embodiment shown in FIG. 2A where the electrified tether has been withdrawn and the airborne unit docked atop the landing perch.

FIG. 2B is a detailed view of the embodiment shown in FIG. 2A where the electrified tether 300 has been withdrawn and the airborne unit 150 docked atop the landing perch 400. In this embodiment, the landing perch 400 has a general U-shape with a left vertical portion 475 and right vertical portion 477 extending upwardly from a substantially horizontal connecting portion 476 to create the general U shape. Additionally, a left perch 480 is attached to the left vertical portion 475 and is generally perpendicular to the left vertical portion 475. Similarly, in this embodiment, a right perch 481 is attached to the right vertical portion 477 and is generally perpendicular to the right vertical portion 477. Both the left perch 480 and right perch 481 are preferably horizontal, but of course recognizing that their precise orientation is constantly changing once installed into the water.

An aperture 420 is preferably placed near the center of the horizontal connecting portion 476 and is sized to allow the electrified tether 300 to pass through the aperture 420 as the tether 300 is retracted onto the winch 425 or payed out from the winch 425 during launching/landing and flight operations. The orientation of the airborne unit 150 shown is generally the most desirable for launching/landing and stowing operations. Here, this orientation can be described by positioning the propellers and their motors 160 facing upwardly with the wing 190 substantially horizontal and placed atop the left perch 480 and right perch 481. Ideally, the wing 190 is substantially perpendicular to the left perch 480 and right perch 481, but can vary slightly depending on conditions during launching/landing (high winds or rough water). The fuselage 180 of the airborne unit 150 is generally parallel to the left vertical portion 475 and right vertical portion 477 and is positioned near the center of the U-shape, preferably near equidistant from the left vertical portion 475 and right vertical portion 477. Once into the docked position as shown here, the airborne unit 150 may be serviced or left in place for incoming severe weather.

Figure 2C:
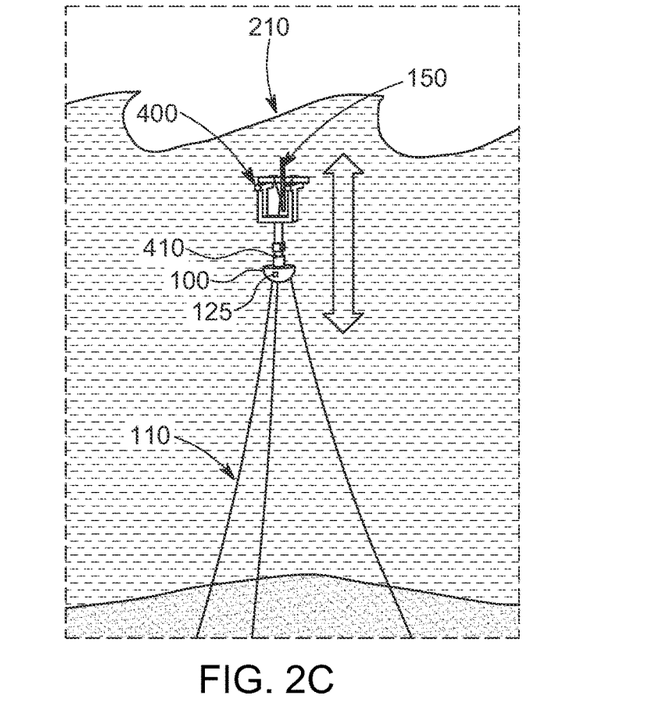
FIG. 2C is a detailed view of the embodiment shown in FIG. 2A where the submersible platform and landing perch have been lowered (moved closer to the sea bed) until both are below the surface of the water.

FIG. 2C is a detailed view of the embodiment shown in FIG. 2A where the submersible platform 100 and landing perch 400 have been lowered (moved closer to the sea bed) until both are below the surface of the water 210. As the airborne unit 150 has been docked, it also travels closer to the sea bed and then beneath the surface of the water 210. As described above, the activation of the winch(es) 125 will draw the tether(s) 110 into the platform 100, thus causing the entire assembly to move towards the sea bed. When the winch(es) 125 pay out the tether(s) 110, the entire assembly moves towards the water surface 210. In the scenario shown, the airborne unit 150 may be docked and then held under the surface of the water 210 during a time of severe weather, such as rough water or high winds. By storing the airborne unit 150 and other components well beneath the water surface 210, damage to the components can be reduced or eliminated from this severe weather. Once the severe weather passes, the platform 100 may again raise until the perch 400 is above water and the airborne unit 150 can be safely launched again.

Figure 3:
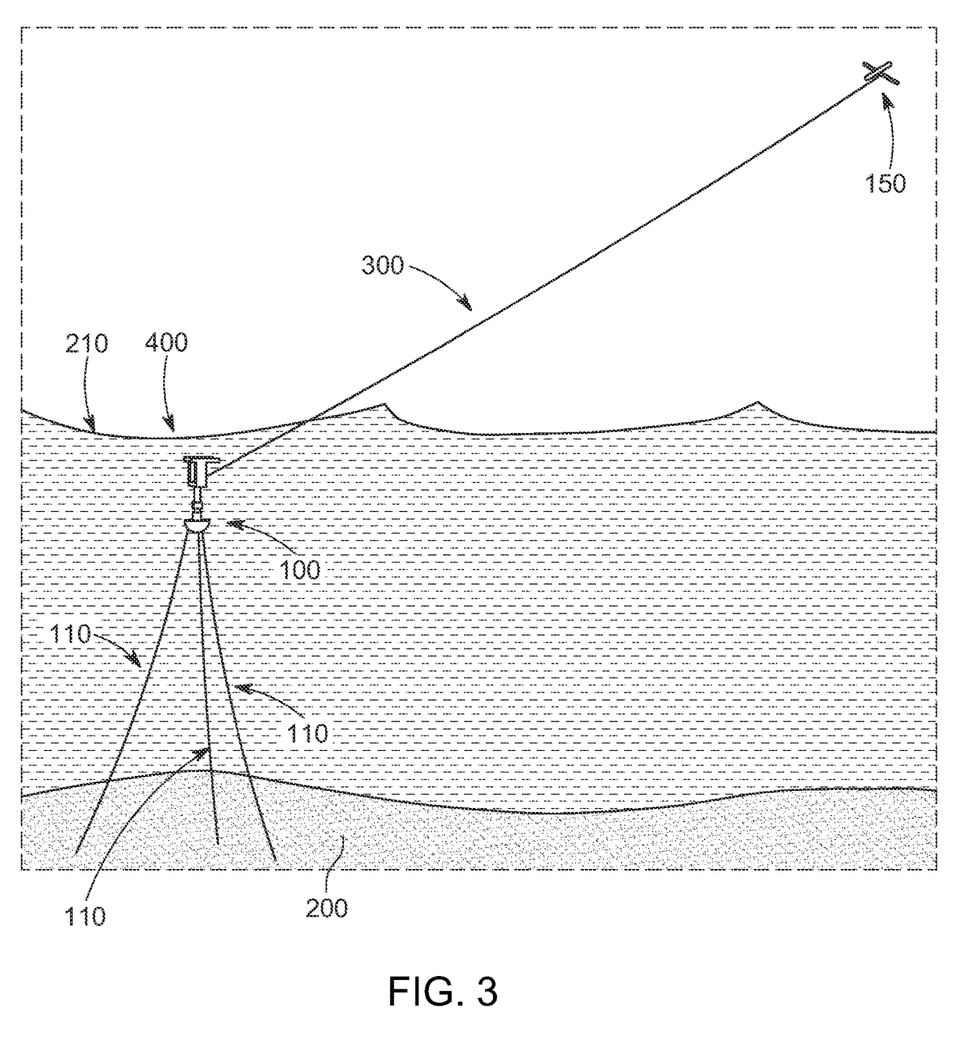
FIG. 3 is a front projection view of the embodiment in FIG. 1 where the submersible platform and landing perch have been lowered (moved closer to the sea bed) until both are below the surface of the water, here while the airborne unit remains in the sky.

FIG. 3 is a right side projection view of the embodiment in FIG. 1 where the submersible platform 100 and landing perch 400 have been lowered (moved closer to the sea bed 200) until both are below the surface of the water 210, here while the airborne unit 150 remains in the sky. It has been discovered that this orientation can reduce the reactive forces between the platform 100 and the airborne unit 150 so that stresses on the tether(s) 110, platform 100, electrified tether 300, and other components can be minimized.

Figure 4:
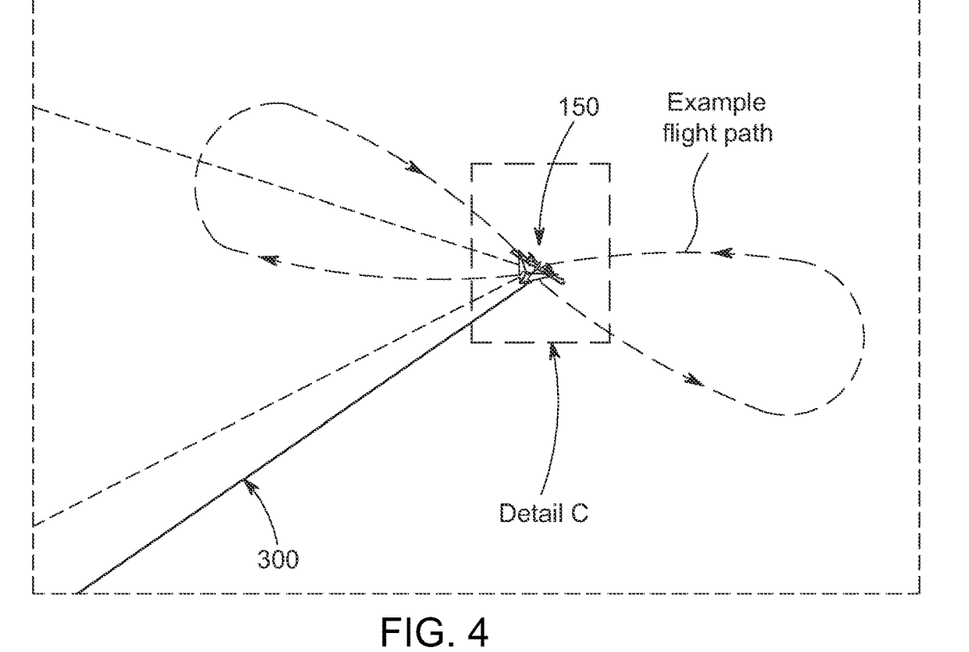
FIG. 4 is a detailed view of Detail B, also showing the location of Detail C.

FIG. 4 is a detailed view of Detail B, also showing the location of Detail C. Here we see the electrified tether 300 connecting with the airborne unit 150 which is shown flying an example of a preferred flight path. However, it should be noted that while a general figure eight shape is preferred, the precise parameters of the flight path and its shape can change quite often, sometimes by the second depending on the conditions. This flight path was only provided as an example to the reader of the general art here, although other types of specific flight paths could be used with the various embodiments described herein.

Figure 5:
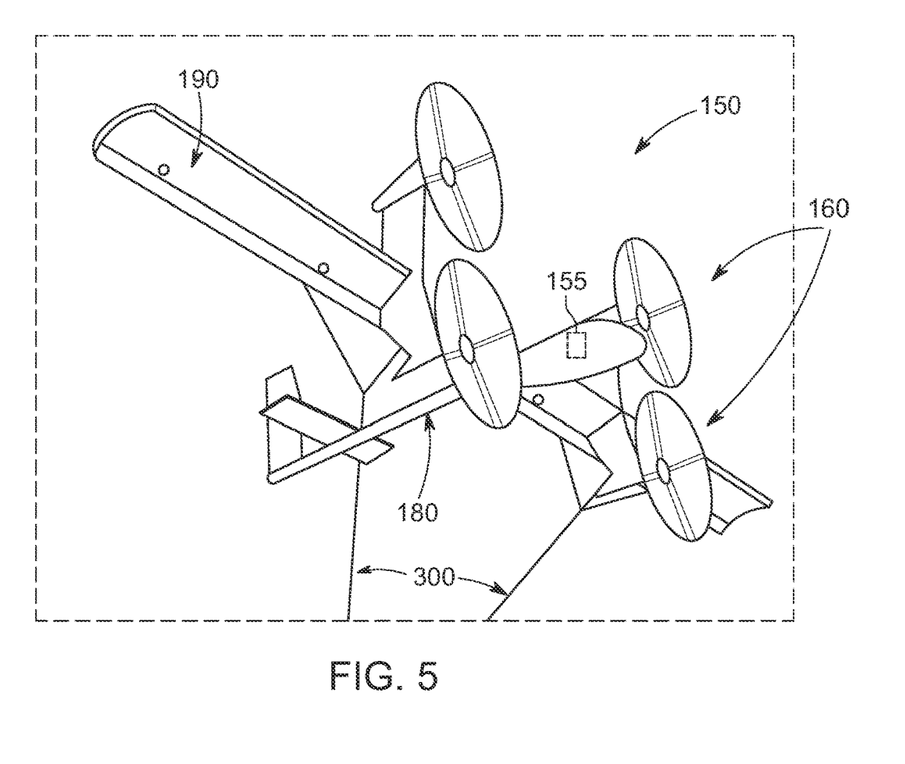
FIG. 5 is a detailed view of Detail C.

FIG. 5 is a detailed view of Detail C, showing an example of an airborne unit 150. In this embodiment, the airborne unit 150 generally resembles a multi-propeller plane or drone with a wing 190 that is connected generally perpendicular to a fuselage 180. Various portions of the wing 190 and optionally the front of the fuselage 180 can be locations for propellers and their motors 160. An airborne unit controller 155 is also preferably located on the airborne unit 150 and is used to control power sent to the propeller motors 160 to optimize various parameters and maximize power efficiency and/or power generation given the weather conditions. Again, while this design for the airborne unit and this particular number of propellers are shown here, this is only an example, as many other designs could be used with the exemplary embodiments herein.

Figure 6:
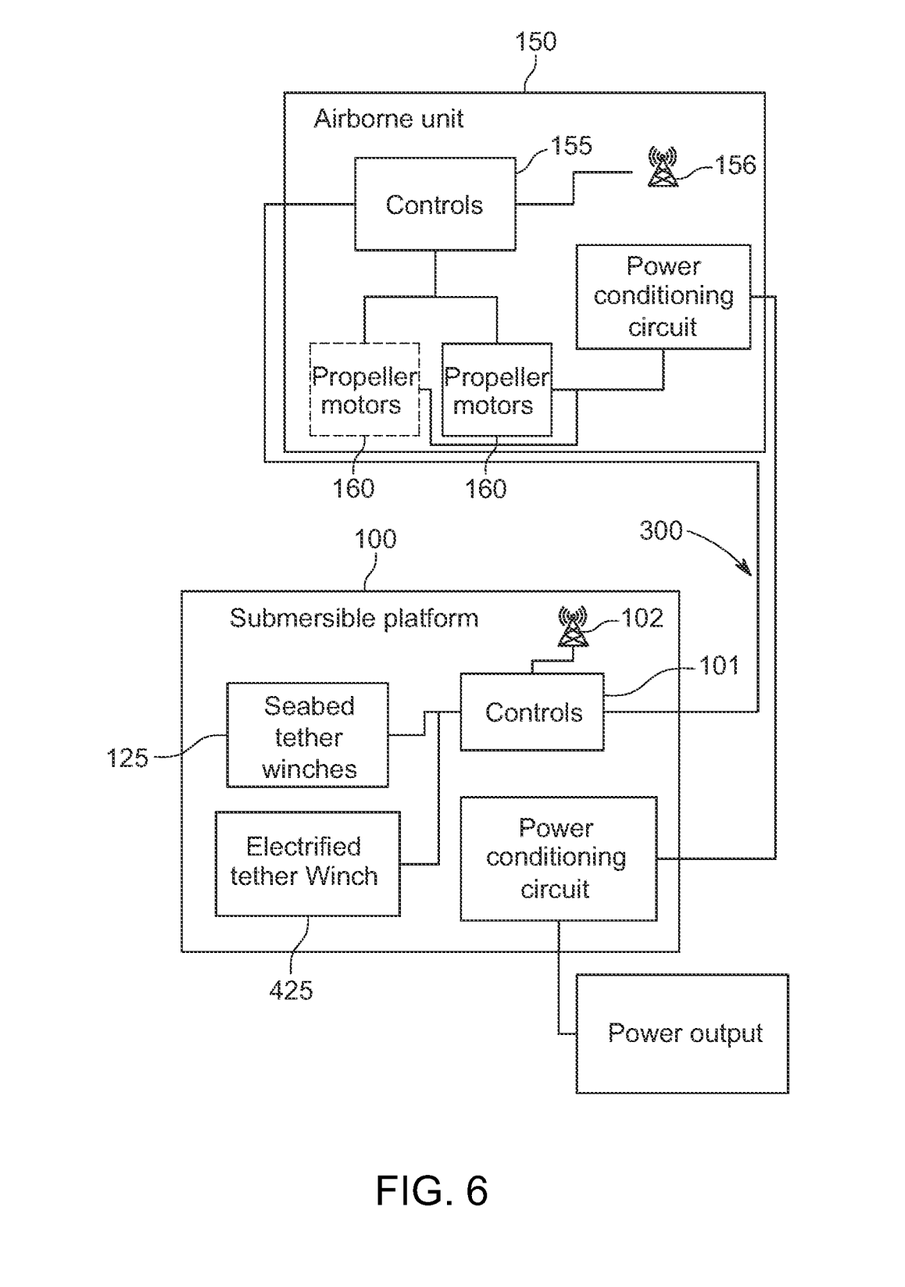
FIG. 6 is a simplified electrical block diagram for controlling the embodiments of the system shown in FIGS. 1-5 above.

FIG. 6 is a simplified electrical block diagram for controlling the exemplary embodiments of the system. As noted above, the airborne unit 150 preferably contains an on-board controller 155 which is in electrical connection with the propeller motors. The electrified tether 300 may comprise a plurality of different tethers or cables, some electrified and some providing reinforcing strength only, which have been combined together. For example, one portion of the electrified tether 300 may be one or more low voltage signal cables which connect to the controls 101 found on the submersible platform 100. Another portion of the electrified tether 300 may be one or more high voltage cables which connect from the power conditioning circuit in the airborne unit 150 with a power conditioning circuit in the submersible platform 100. In some embodiments, the control signals between the controller 155 and the controller 101 would not be wired but would instead be wireless, as indicated by the wireless transmitter/receivers 102 and 156 on the submersible platform 100 and airborne unit 150 respectively. The wireless transmitter/receivers 102 and 156 could be wi-fi (any type), Bluetooth (any type), or satellite (any type) and could not only communicate between controllers 101/155 but could also communicate with other outside controllers or sensors.

After the power conditioning circuit in the submersible platform 100, the outgoing power may be sent out, either directly to shore for transmission into the grid or to an electrical substation that could be on shore or underwater and near the FAWE system or a farm of many FAWE systems. The power output could also be sent to an energy storage system such as battery storage or mechanical energy storage.

Figure 7:
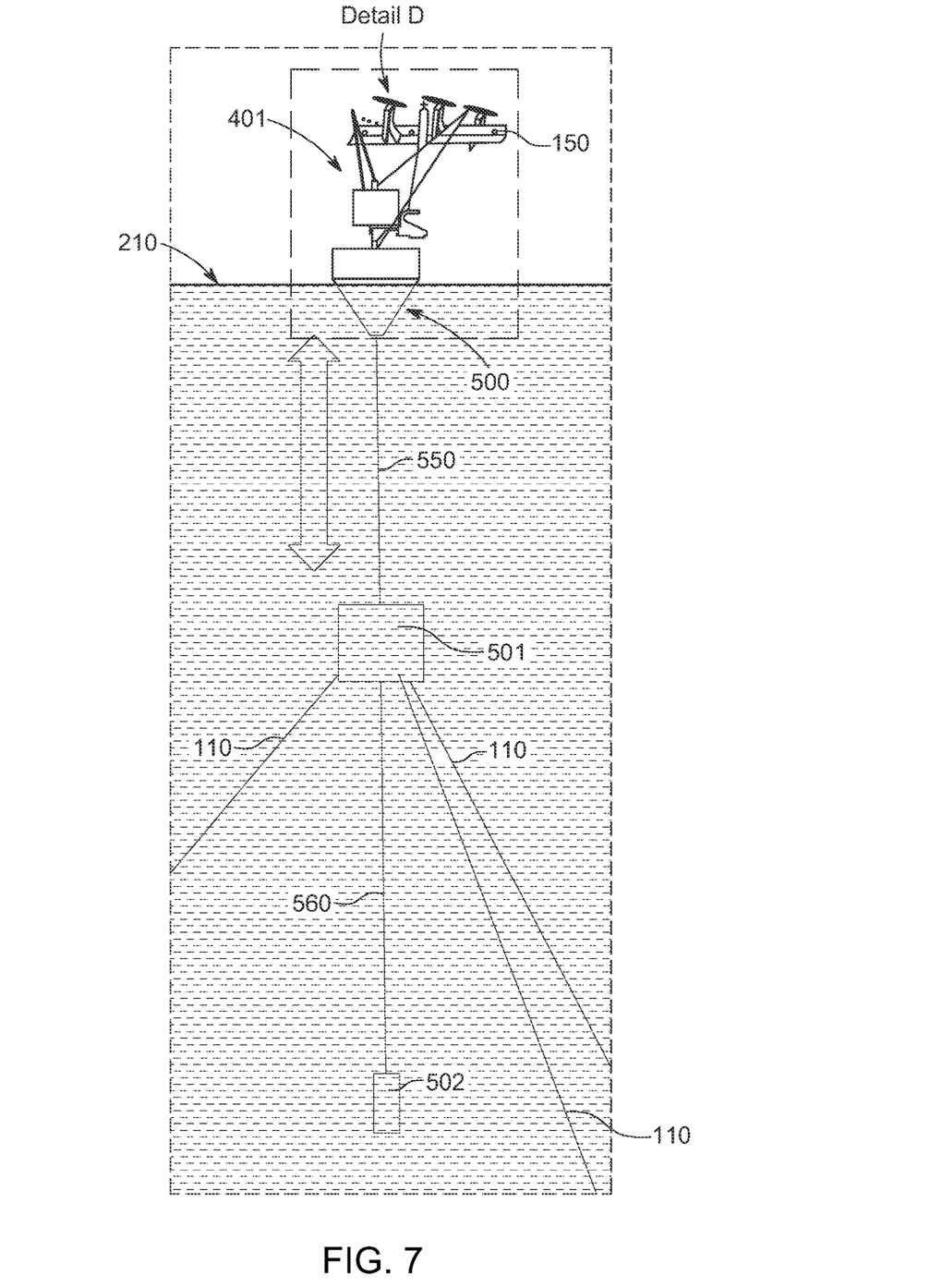
FIG. 7 is a front projection view of an another exemplary embodiment of the floating airborne wind energy system (FAWES) with a submersible platform, underwater docking station and counter-weight, indicating the location of Detail D.

FIG. 7 is a front projection view of an another exemplary embodiment of the floating airborne wind energy system (FAWES) with a submersible platform 500, underwater docking station 501 and counter-weight 502, also indicating the location of Detail D. In this embodiment, an underwater docking station 501 is attached to the sea bed with sea bed tethers 110 and an optional counterweight 502 is suspended from the underwater docking station 501 by the counterweight tether 560. The submersible platform 500 is preferably connected to the docking station 501 using a docking station tether 550. While the docking station 501 is generally held at a fixed point from the sea bed, the submersible platform 500 is permitted to raise/lower itself relative to the sea bed by using a ballast pump, winch, or some combination as will be described further below.

A landing perch 401 is again preferably fixed to the top portion of the submersible platform 500 and here shows the airborne unit 150 docked atop the landing perch 401. In this figure, the submersible platform 500 has risen to its highest point where it generally floats atop the water surface 210.

Figure 8:
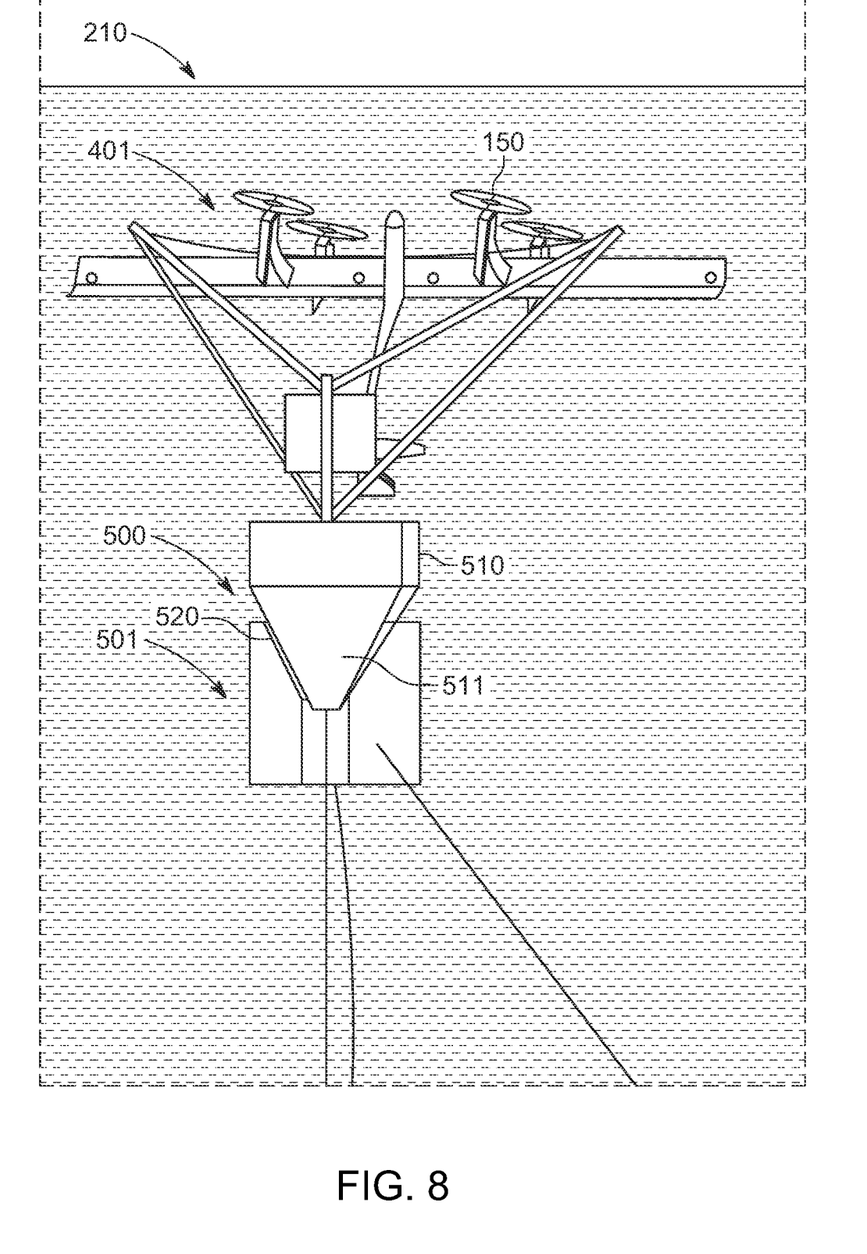
FIG. 8 is a front projection view of the embodiment shown in FIG. 7, where the submersible platform including the airborne unit has been lowered to engage with the underwater docking station.

FIG. 8 is a front projection view of the embodiment shown in FIG. 7, where the submersible platform 500 including the airborne unit 150 has been lowered to engage with the underwater docking station 501. The system may be put into this position when severe weather is approaching, to protect the airborne unit 150 from damage. This could also be a temporary position for an airborne unit that is malfunctioning, in order to hold the unit in a safe condition until repairs can be made.

In this embodiment, the submersible platform 500 has an upper portion 510 which is generally cylindrical and has a mostly constant radius. The submersible platform 500 then preferably has a lower portion 511 extending below the upper portion 510 and having a radius that gradually decreases as one moves downwardly. It could also be said that the lower portion 511 generally has a conical shape. Also shown here is a corresponding female conical shape in the upper portion 520 of the docking station 501, which accepts at least a portion of the male conical shape in the lower portion 511 of the platform 500. Of course, it should be stated that any interfacing male/female shapes would work here, and the general conical shape is not required for all embodiments.

Figure 9:
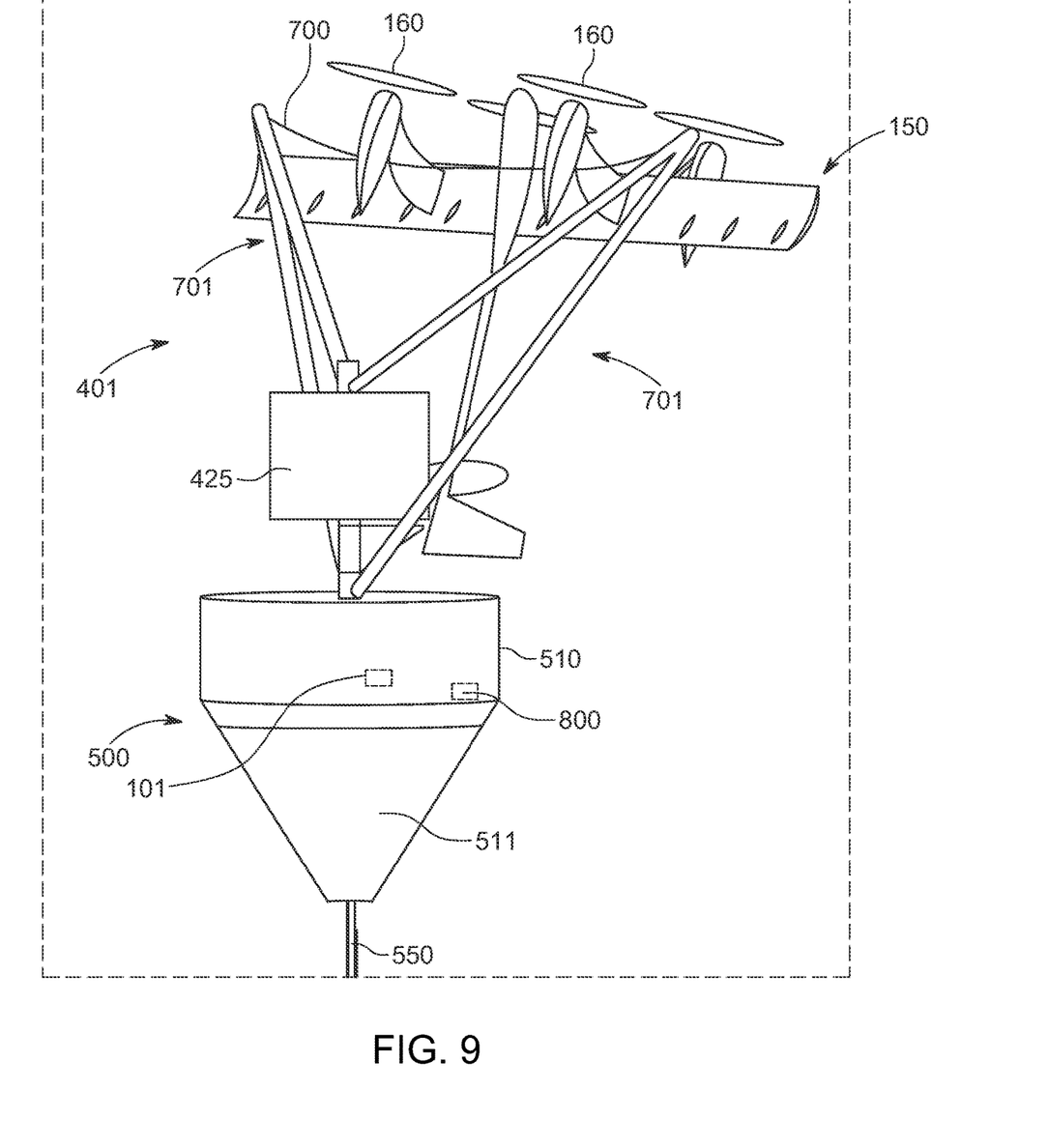
FIG. 9 is a detailed view of Detail D.

FIG. 9 is a detailed view of Detail D. Similar to the embodiments above, the airborne unit 150 can be winched towards/away from the platform 500 using the electrified tether winch 425 so that the airborne unit 150 can both launch/land as well as change altitude or other flight characteristics. The electrified tether winch 425 is preferably fixed within or above the submersible platform 500 and is in electrical communication with a platform controller 101.

In this embodiment, the landing perch 401 is primarily comprised of a pair of arms 701 which extend upwardly and away from each other to provide an attachment point for the landing bar 700. In this way, the landing bar 700 is substantially horizontal and elevated vertically above the platform 500, fixed to the highest vertical points on the arms 701. The landing bar 700 is preferably somewhat flexible, so that it can absorb some of the forces of launching/landing without translating these to the airborne unit 150. Preferably when launching/landing the propellers 160 are oriented upwardly and on the opposing side of the airborne unit 150 as the landing bar 700.

Also in this embodiment, a ballast pump 800 may be used to pump water in/out of the submersible platform 500 in order to raise/lower the platform 500 relative to the sea bed. Again the preferred conical shape for the lower portion 511 of the platform 500 is shown extending below the upper portion 510 which has a more cylindrical shape but again this is not required but has been found to be preferable.

It should be noted that the embodiments shown in FIGS. 1-6 could also utilize the ballast pump 800 as described herein to help raise/lower and temporarily fix the underwater height of the submersible platform 100.

Figure 10:
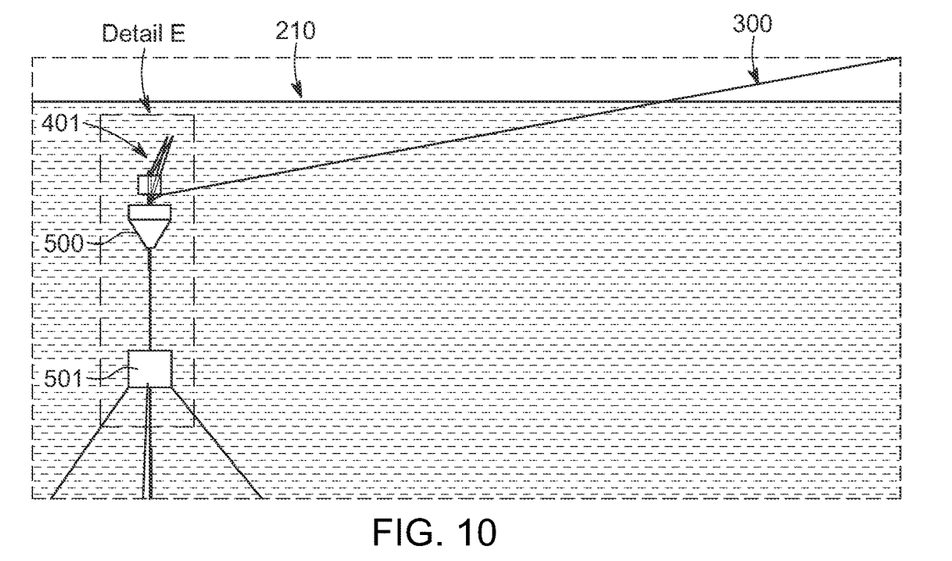
FIG. 10 is a front projection view of the embodiment in FIG. 7 where the submersible platform and landing perch have been lowered (moved closer to the sea bed) until both are below the surface of the water, here while the airborne unit remains in the sky, also indicating the location for Detail E.

FIG. 10 is a front projection view of the embodiment in FIG. 7 where the submersible platform 500 and landing perch 410 have been lowered (moved closer to the sea bed) until both are below the surface of the water 210, here while the airborne unit 150 remains in the sky, also indicating the location for Detail E. This position would be the preferred position of the submersible platform 500 for power generation, where the platform 500 and electrified tether winch 425 are located far enough below the water surface 210 to ensure that the platform 500 will remain underwater even during the trough of the largest expected wave but not so deep that drag on the electrified tether 300 becomes significant. In other words, the submersible platform 500 should only be held deep enough to ensure force stability on the platform 500 and that it remains below water even during the largest expected wave. Using the exemplary embodiments herein, electronic communications through the transmitter/receiver 102 would allow the controller 101 to direct the ballast pump 800 to increase/decrease water in the submersible platform 500 to ensure that the depth of the platform 500 could be changed due to changing environmental conditions (i.e. large waves or a storm).

Figure 11:
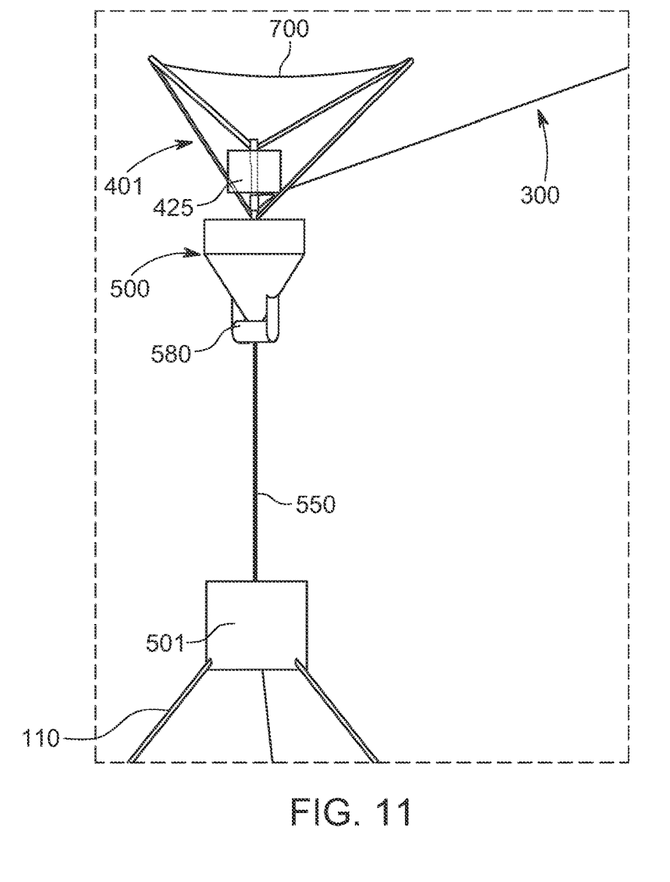
FIG. 11 is a detailed view of Detail E, showing an optional submersible platform winch.

FIG. 11 is a detailed view of Detail E, showing an optional submersible platform winch 580 for reeling in or paying out the docking station tether 550. As mentioned above, the distance between the platform 500 and docking station 501 can be controlled by a combination of the ballast pump 800 as well as a submersible platform winch 580, or by the ballast pump 800 alone, or by the winch 580 alone. In a preferred embodiment, the position of the platform 500 would be controlled by a combination of the two. The docking station tether 550 could be a cable, wire-rope, chain, or some combination.

Figure 12:
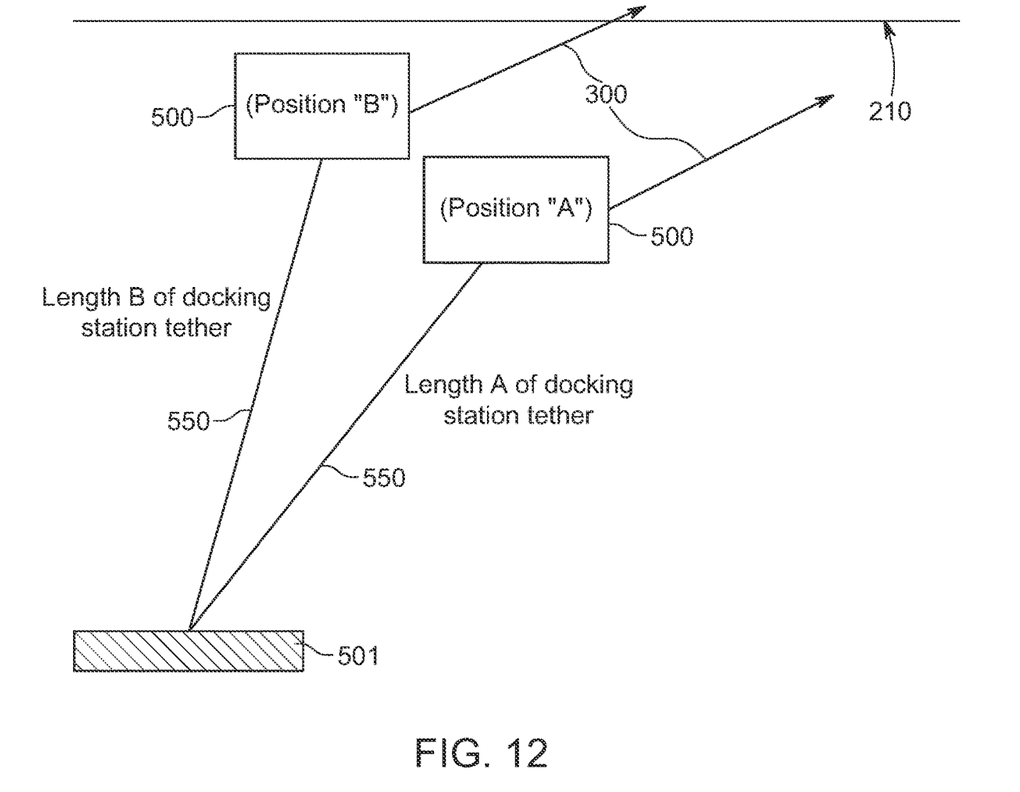
FIG. 12 is a force diagram representing two positions (A and B) for the submersible platform during the operation cycle of the airborne unit, here used with a dynamic control of the optional submersible platform winch.

FIG. 12 is a force diagram representing two positions (A and B) for the submersible platform 100/500 during the operation cycle of the airborne unit 150, here used with a dynamic control of the optional submersible platform winch 580. Here, it has been discovered that varying the length of the docking station tether 550 by the winch 580 during the operation of the airborne unit 150 can smooth out the forces in the tether 550 that are applied to the platform 500. This reduces overall forces in the system and shock that is applied to the platform 500 and its components. In an exemplary embodiment, the controls 155 of the airborne unit 150 would communicate with the controls 101 of the submersible platform so that the winch 580 could adjust between Length A and Length B at the appropriate time(s).

A similar force attenuation effect may be obtained without active control of docking station tether length 550 by recognizing that Position A has stored energy from airborne unit 150 due to the increased depth of platform 100/500 relative to Position B of platform 100/500. This energy may be returned to airborne unit 150 during the less energetic portion of the cycle, specifically by increasing the apparent wind velocity experienced by airborne unit 150 at position B. The control of the combination of buoyancy and mass of platform 100/500 (with pump 800) and optional docking station tether length 550 (with optional winch 580) can help optimize forces in the system or power output by the system, and these values may preferably be varied according to the control parameters of airborne unit 150. Also of note is that the tether fastening docking platform 100/500 to ground may be one or more tethers connecting to either a docking station 501 or to the sea bed directly.

Figure 13:
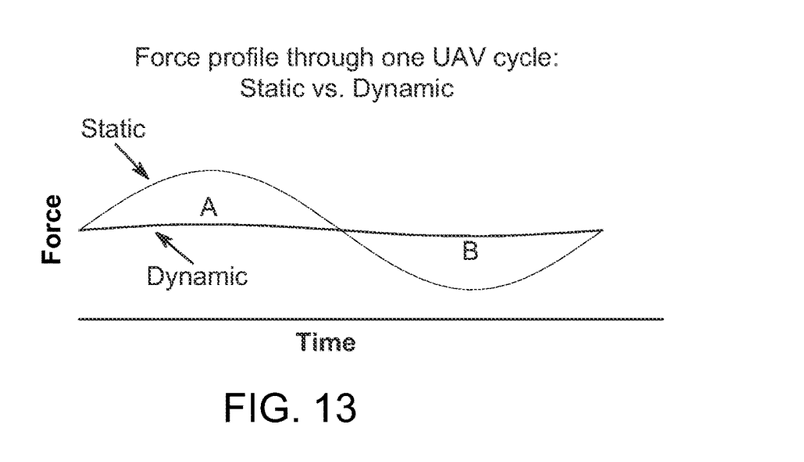
FIG. 13 is a notional graph of forces in the electrified tether for a static platform vs. a dynamically controlled platform.

FIG. 13 is a notional graph of forces in the electrified tether 300 for a static platform 100/500 vs. a dynamically controlled platform 100/500 as described above.

Figure 14:
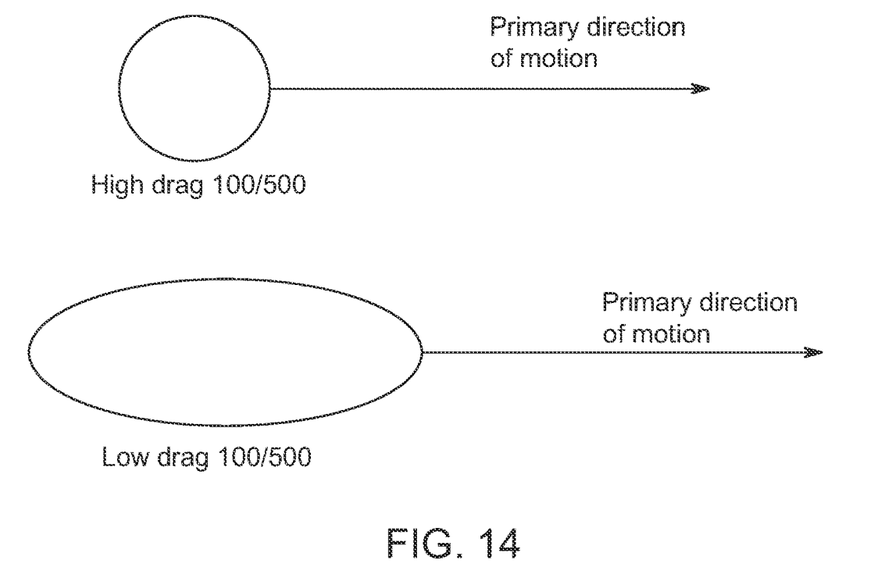
FIG. 14 is an illustration of ideal cross-sections for the submersible platforms based on the primary direction of motion of the platform through the water during a cycle of the airborne unit.

FIG. 14 is an illustration of ideal cross-sections for the submersible platforms based on the primary direction of motion of the platform through the water during a cycle of the airborne unit. As shown, a preferable cross-section for the submersible platforms 100/500 would have an elliptical shape, but anything where the platform cross-section has been faired so that the platform has lower drag through the predominant direction of motion. In some embodiments, a turbine could be used to harvest this excess energy.

Figure 15:
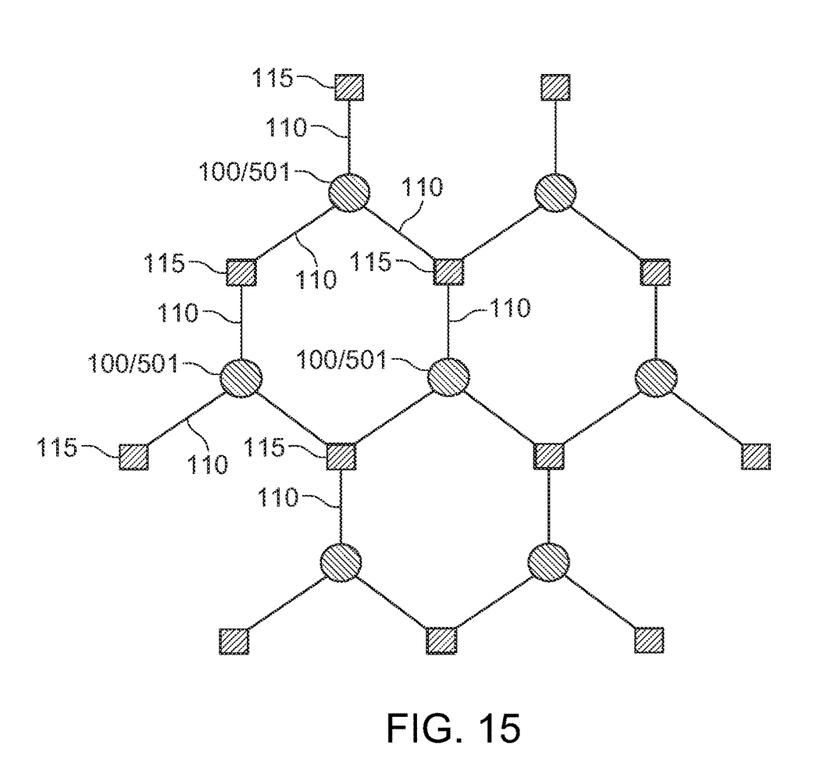
FIG. 15 is a top view of the preferred location for sea bed anchors and submersible platforms/underwater docking stations for a floating airborne wind energy (FAWE) system using the various embodiments shown herein.

FIG. 15 is a top view of the preferred location for sea bed anchors 115 and submersible platforms 100/underwater docking stations 501 for a floating airborne wind energy (FAWE) system using the various embodiments shown herein. As shown, the sea bed anchors 115 could be shared between two or more adjacent submersible platforms 100/underwater docking stations 501. In the embodiment shown, the submersible platforms 100/underwater docking stations 501 would be placed in a hexagonal pattern around a central sea bed anchor 115.

Figure 16:
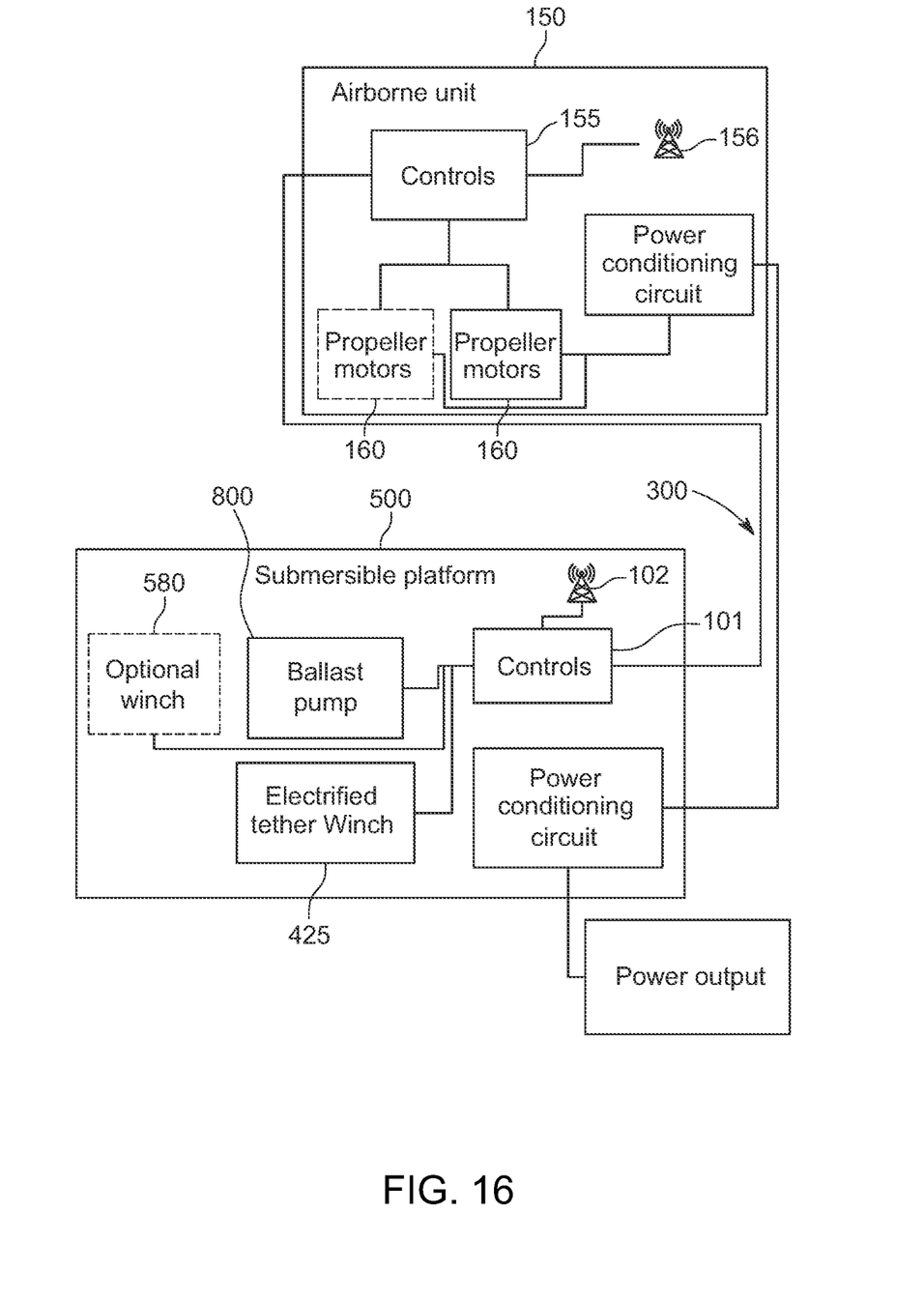
FIG. 16 is a simplified electrical block diagram for controlling the embodiments of the system shown in FIGS. 7-15 above.

FIG. 16 is a simplified electrical block diagram for controlling the embodiments of the system shown in FIGS. 7-15 above. Here, the submersible platform 500 preferably contains an electronic controller 101 in electronic communication with the ballast pump 800, electrified tether winch 425, and the optional docking station tether winch 580. Similar to the embodiment in FIG. 6, the controls 155 of the airborne unit 150 may communicate with the controls 101 of the submersible platform 100 either through a hard wired connection in the electrified tether 300 or through wireless communication through wireless transmitter/receivers 102 and 156.

It should be noted that while the water surface 210 has been used throughout to describe the relative location of the submersible units, it is well understood that the water surface 210 is generally not stationary and will move with the swell of the ocean/lake, wind, and/or large waves. Thus, as understood herein, the water surface 210 represents the mean water line or average between the highest/lowest swells for the given conditions which can change as the conditions change. It is thus a dynamic point that is difficult to pin down but "water surface" has been used herein for the convenience of the reader to help explain the advantageous of the invention.

As used herein, the term "controls" is used to represent an electronic controller capable of executing software instructions for performing any of the features described herein. In some cases the controls are microcontrollers, microprocessors, or CPU/RAM combination.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. An airborne power generation assembly comprising:
   an airborne power generation unit;
   a submersible platform comprising:
      a submersible platform winch;
      an electrified tether winch;
      a ballast pump adapted for pumping water into and out of the submersible platform; and
      a first electronic controller in electronic communication with the submersible platform winch and the ballast pump;
   a sea bed tether adapted at a first end for attachment to the sea bed and adapted at a second end for attachment to the submersible platform winch;
   and
   an electrified tether connecting between the electrified tether winch and the airborne power generation unit,
   wherein the first electronic controller is configured to actuate at least one of the submersible platform winch and the ballast pump to fully submerge the submersible platform while the airborne power generation unit is airborne.

2. The airborne power generation assembly of claim 1 further comprising:
   a landing perch extending above the submersible platform.

3. The airborne power generation assembly of claim 2 wherein:
   the landing perch is generally U-shaped.

4. The airborne power generation assembly of claim 2 wherein
   the landing perch contains a substantially horizontal portion for accepting the airborne power generation unit.

5. The airborne power generation assembly of claim 1 further comprising:
   a second electronic controller positioned on the airborne power generation unit,
   wherein the first and second controller communicate electronically to control the electrified tether winch.

6. The airborne power generation assembly of claim 1 further comprising:
   an underwater docking station positioned beneath the submersible platform;
   at least one sea bed tether connecting the underwater docking station to the sea bed; and
   a docking station tether connecting the submersible platform winch to the underwater docking station.

7. The airborne power generation assembly of claim 6 further comprising:
   a counterweight suspended from the underwater docking station.

8. The airborne power generation assembly of claim 2 further comprising:
   a shock absorbing mechanism positioned on the submersible platform and placed beneath the landing perch.

9. The airborne power generation assembly of claim 6 further comprising:
   a female portion on the underwater docking station which accepts a male portion on the submersible platform.

10. The airborne power generation assembly of claim 6 wherein
    the submersible platform winch is controlled by electrical signals from the airborne power generation unit.

11. An airborne power generation assembly comprising:
    an airborne power generation unit;
    a submersible platform;
    a ballast pump positioned to draw water into the submersible platform;
    an electrified tether winch attached to the submersible platform;
    an electrified tether connecting between the electrified tether winch and the airborne power generation unit;
    at least one sea bed tether connecting the submersible platform to the sea bed;
    a landing perch extending above the submersible platform; and
    a sea bed tether winch positioned on the submersible platform and connected to each sea bed tether,
    wherein the ballast pump and sea bed tether winch are used simultaneously in combination to raise and lower the submersible platform.

12. The airborne power generation assembly of claim 11 further comprising:
    an aperture in the landing perch for allowing the electrified tether to pass through the landing perch.

13. The airborne power generation assembly of claim 11 further comprising:
    a shock absorbing mechanism positioned on the submersible platform and placed beneath the landing perch.

14. An airborne power generation assembly comprising:
    an airborne power generation unit;
    a submersible platform capable of holding water so that the submersible platform can sink beneath an upper surface of a body of water;
    an electrified tether winch attached to the submersible platform;
    an electrified tether connecting between the electrified tether winch and the airborne power generation unit;
    an underwater docking station positioned beneath the submersible platform;
    at least one sea bed tether connecting the underwater docking station to the sea bed; and
    a docking station tether connecting the floating platform to the underwater docking station.

15. The airborne power generation assembly of claim 14 further comprising:
    an upper portion on the underwater docking station which accepts a lower portion on the submersible platform.

16. The airborne power generation assembly of claim 15 further comprising:
    a perch positioned above the submersible platform.

17. The airborne power generation assembly of claim 14 further comprising:
    a submersible platform winch attached to the docking station tether which is controlled by electrical signals from the airborne power generation unit.

* * * * *